US009409400B2

(12) United States Patent
Park et al.

(10) Patent No.: US 9,409,400 B2
(45) Date of Patent: Aug. 9, 2016

(54) IMAGE FORMING APPARATUS CONFIGURED TO INCLUDE NOZZLE FACE CAPPING CONTROL

(71) Applicants: Soyoung Park, Kanagawa (JP); Mikio Ohashi, Kanagawa (JP); Yoichi Ito, Kanagawa (JP); Fumitaka Kikkawa, Kanagawa (JP)

(72) Inventors: Soyoung Park, Kanagawa (JP); Mikio Ohashi, Kanagawa (JP); Yoichi Ito, Kanagawa (JP); Fumitaka Kikkawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/151,058

(22) Filed: Jan. 9, 2014

(65) Prior Publication Data

US 2014/0204413 A1 Jul. 24, 2014

(30) Foreign Application Priority Data

Jan. 18, 2013 (JP) ................................ 2013-006851

(51) Int. Cl.
*G06K 15/00* (2006.01)
*B41J 2/165* (2006.01)

(52) U.S. Cl.
CPC .................................. *B41J 2/16511* (2013.01)

(58) Field of Classification Search
CPC .................................................. B41J 2/16511
See application file for complete search history.

(56) References Cited

U.S. PATENT DOCUMENTS

| | | | | |
|---|---|---|---|---|
| 5,552,815 | A | 9/1996 | Shimoda | |
| 5,852,452 | A | 12/1998 | Imai | |
| 6,247,784 | B1 * | 6/2001 | Obana | B41J 2/17543 347/37 |
| 6,530,634 | B1 * | 3/2003 | Hara | B41J 2/16508 347/108 |
| 2007/0139506 | A1 | 6/2007 | Yonekawa | |
| 2011/0141181 | A1 | 6/2011 | Ito et al. | |
| 2012/0056932 | A1 | 3/2012 | Matsubara et al. | |
| 2012/0056933 | A1 | 3/2012 | Tanaka et al. | |
| 2012/0062648 | A1 | 3/2012 | Tanaka et al. | |
| 2012/0081487 | A1 | 4/2012 | Tanaka et al. | |
| 2012/0113204 | A1 | 5/2012 | Tanaka et al. | |
| 2012/0133706 | A1 | 5/2012 | Park | |

(Continued)

FOREIGN PATENT DOCUMENTS

| | | |
|---|---|---|
| CN | 102529402 A | 7/2012 |
| JP | 2000-326525 | 11/2000 |
| JP | 2007-125871 | 5/2007 |

OTHER PUBLICATIONS

Apr. 22, 2015 Chinese official action in corresponding Chinese Patent Application No. 201410020243.1.

*Primary Examiner* — Steven Kau
*Assistant Examiner* — Andrew H Lam
(74) *Attorney, Agent, or Firm* — Cooper & Dunham LLP

(57) ABSTRACT

An image forming apparatus includes an apparatus body, a recording head, a maintenance unit, a cover, and a controller. The recording head has a nozzle face and nozzles in the nozzle face to eject droplets of liquid. The maintenance unit has a cap to protect the nozzle face of the recording head. The cover opens an interior of the apparatus body to an outside of the apparatus body. The controller performs a normal control to cap the nozzle face of the recording head with the cap on opening of the cover and a special control to expose the nozzle face of the recording head to an area opened by the cover on receipt of an external instruction.

8 Claims, 19 Drawing Sheets

(56) References Cited

U.S. PATENT DOCUMENTS

| | | | |
|---|---|---|---|
| 2012/0133707 | A1 | 5/2012 | Kikkawa et al. |
| 2012/0155916 | A1 | 6/2012 | Ito et al. |
| 2012/0187624 | A1 | 7/2012 | Ito et al. |
| 2012/0224000 | A1 | 9/2012 | Park |
| 2012/0224001 | A1 | 9/2012 | Park |
| 2012/0236072 | A1 | 9/2012 | Kikkawa |
| 2012/0306966 | A1 * | 12/2012 | Tanaka ................. B41J 2/16523 347/36 |
| 2012/0320125 | A1 | 12/2012 | Katoh et al. |
| 2013/0020753 | A1 | 1/2013 | Ito |
| 2013/0187985 | A1 | 7/2013 | Katoh et al. |

* cited by examiner

IMAGE FORMING APPARATUS CONFIGURED TO INCLUDE NOZZLE FACE CAPPING CONTROL

CROSS-REFERENCE TO RELATED APPLICATIONS

This patent application is based on and claims priority pursuant to 35 U.S.C. §119 to Japanese Patent Application No. 2013-006851, filed on Jan. 18, 2013, in the Japan Patent Office, the entire disclosure of which is hereby incorporated by reference herein.

BACKGROUND

1. Technical Field

Exemplary embodiments of this disclosure relate to an image forming apparatus and more specifically to an image forming apparatus including a recording head to eject liquid droplets.

2. Description of the Related Art

Image forming apparatuses are used as printers, facsimile machines, copiers, plotters, or multifunction devices having two or more of the foregoing capabilities. As one type of image forming apparatuses employing a liquid-ejection recording method, for example, inkjet recording apparatuses are known that use a recording head(s) for ejecting droplets of liquid (e.g., ink).

Such image forming apparatuses may have a maintenance unit (maintenance-and-recovery unit) including caps to cap nozzle faces of recording heads. When the image forming apparatus is on standby for printing or a cover is opened to open the inside of an apparatus body to the outside, the caps cap and protect the nozzle faces of the recording heads.

To facilitate maintenance work of a service person, for example, JP-2000-326525-A proposes an inkjet recording apparatus that allows a service person to forcefully replace ink cartridges and conduct maintenance work when the service person turns the power on with a maintenance switch turned on.

For such an inkjet-type image forming apparatus, for example, when the apparatus is left unused for a long time, ink may firmly adhere to the nozzle faces of the recording heads, thus causing skewed ejection or non-ejection of droplets. Hence, for example, a wet cleaner may be provided to clean the nozzle faces and remove such firmly-adhering ink.

However, for the above-described inkjet recording apparatus, as described above, the nozzle faces are capped with the caps during standby and so forth, thus hampering a service person from easily checking and cleaning the nozzle faces of the recording heads.

BRIEF SUMMARY

In at least one exemplary embodiment of this disclosure, there is provided an image forming apparatus including an apparatus body, a recording head, a maintenance unit, a cover, and a controller. The recording head has a nozzle face and nozzles in the nozzle face to eject droplets of liquid. The maintenance unit has a cap to protect the nozzle face of the recording head. The cover opens an interior of the apparatus body to an outside of the apparatus body. The controller performs a normal control to cap the nozzle face of the recording head with the cap on opening of the cover and a special control to expose the nozzle face of the recording head to an area opened by the cover on receipt of an external instruction.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
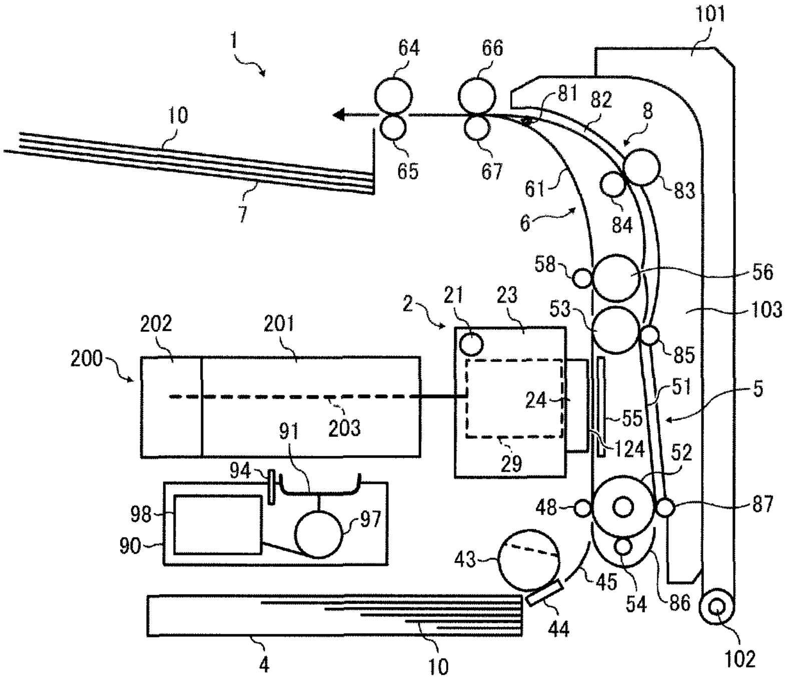
FIG. 1 is a side view of a mechanical section of an image forming apparatus according to exemplary embodiments of this disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

For example, in this disclosure, the term “sheet” used herein is not limited to a sheet of paper and includes anything such as OHP (overhead projector) sheet, cloth sheet, glass sheet, or substrate on which ink or other liquid droplets can be attached. In other words, the term “sheet” is used as a generic term including a recording medium, a recorded medium, a recording sheet, and a recording sheet of paper. The terms “image formation”, “recording”, “printing”, “image recording” and “image printing” are used herein as synonyms for one another.

The term “image forming apparatus” refers to an apparatus that ejects liquid on a medium to form an image on the medium. The medium is made of, for example, paper, string, fiber, cloth, leather, metal, plastic, glass, timber, and ceramic. The term “image formation” includes providing not only meaningful images such as characters and figures but meaningless images such as patterns to the medium (in other words, the term “image formation” also includes only causing liquid droplets to land on the medium).

The term “ink” is not limited to “ink” in a narrow sense, unless specified, but is used as a generic term for any types of liquid usable as targets of image formation. For example, the term “ink” includes recording liquid, fixing solution, DNA sample, resist, pattern material, resin, and so on.

The term “image” used herein is not limited to a two-dimensional image and includes, for example, an image applied to a three dimensional object and a three dimensional object itself formed as a three-dimensionally molded image.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Referring now to the drawings, wherein like reference numerals designate identical or corresponding parts throughout the several views, exemplary embodiments of the present disclosure are described below.

First, an image forming apparatus according to exemplary embodiments of this disclosure is described with reference to FIGS. 1 to 4.

Figure 2:
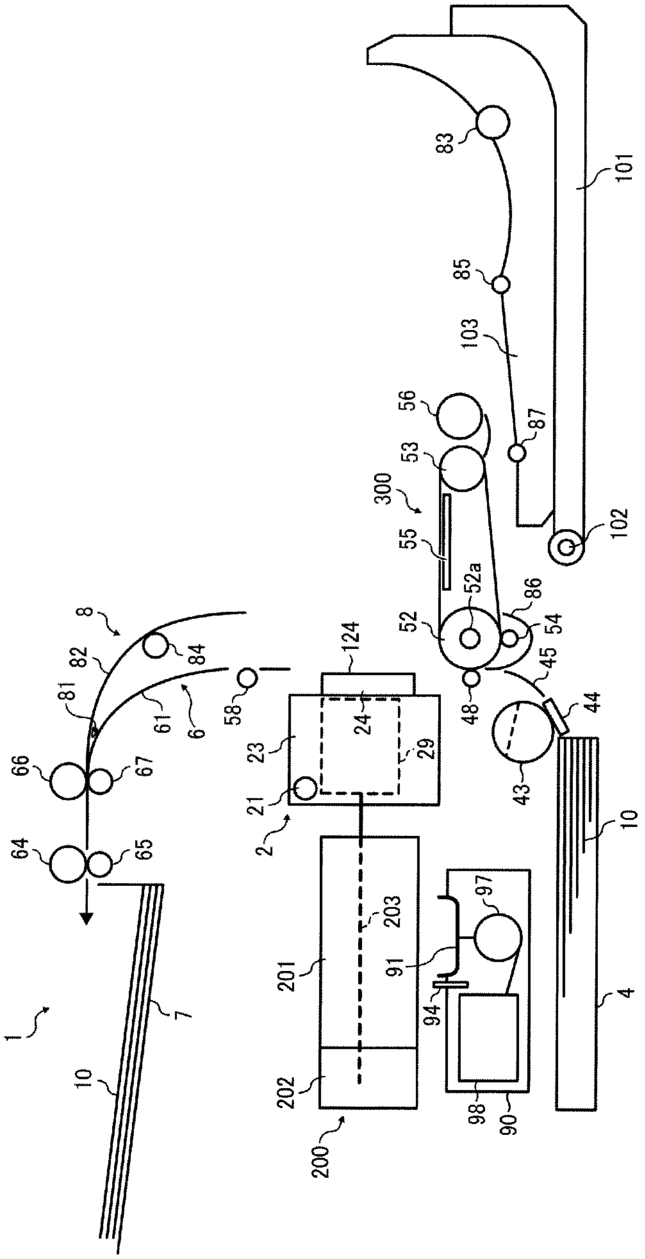
FIG. 2 is a side view of the image forming apparatus of FIG. 1 in a state in which a front cover is open.
Figure 3:
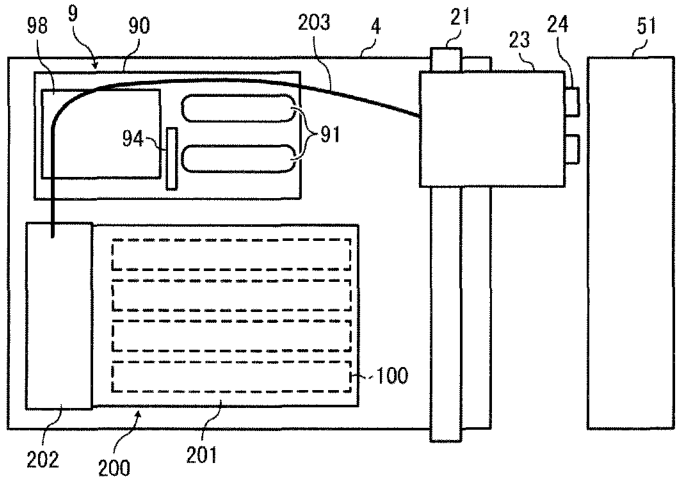
FIG. 3 is a plan view of the image forming apparatus of FIG. 1.
Figure 4:
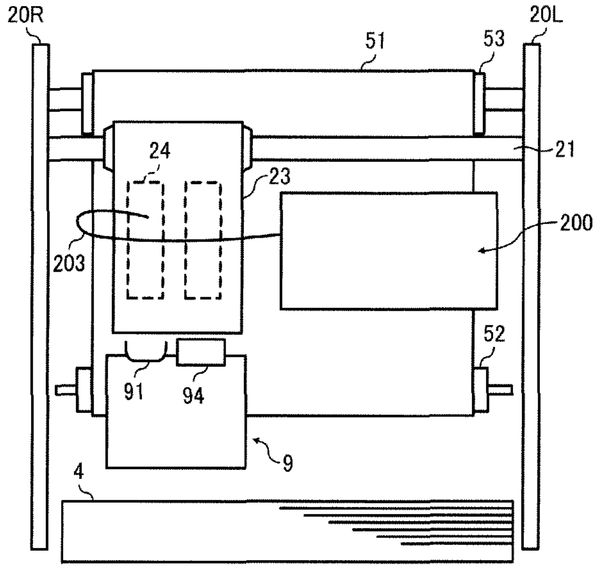
FIG. 4 is a back view of the image forming apparatus of FIG. 1.

FIG. 1 is a side view of a mechanical section of an image forming apparatus according to exemplary embodiments of this disclosure. FIG. 2 is a side view of the image forming apparatus of FIG. 1 in a state in which a front cover is opened. FIG. 3 is a plan view of the image forming apparatus of FIG. 1. FIG. 4 is a back view of the image forming apparatus of FIG. 1.

The image forming apparatus illustrated in FIGS. 1 to 4 is a serial-type image forming apparatus and includes, e.g., an image forming device 2 serving as an image forming unit and a conveyance assembly 5 serving as a conveyance unit inside an apparatus body 1. The image forming apparatus also has a feed tray 4 serving as a sheet feeder to load sheets 10 serving as recording media at a lower side of the apparatus body 1. It is to be noted that the sheet feeder is not limited to the feed tray 4 illustrated in FIGS. 1 to 4. In some embodiments, the sheet feeder is, for example, a sheet feed cassette.

When a sheet 10 is fed from the feed tray 4, the conveyance assembly 5 receives the sheet 10. While the sheet 10 is intermittently conveyed in a vertical direction by the conveyance assembly 5, the image forming device 2 horizontally ejects liquid droplets to record a desired image on the sheet 10. The sheet 10 having the desired image formed thereon is further conveyed upward through an output conveyance unit 6, and discharged onto an output tray 7 serving as an output unit.

For duplex printing (double-face printing), after printing on one face (front face) ends, a reverse unit 8 receives the sheet 10 from the output conveyance unit 6. While conveying the sheet 10 in the opposite direction (downward direction), the conveyance assembly 5 turns around and feeds the sheet 10 toward the image forming device 2 again so that the image forming device 2 can print on the other face (back face) of the sheet 10. After printing on the other face (back face) ends, the output conveyance unit 6 outputs the sheet 10 to the output tray 7.

In the image forming device 2, a carriage 23 mounting at least one recording head 24 is movably supported by a main guide member 21 and a sub guide member extending between a left side plate 101L and a right side plate 101R. A main scanning motor 25 of a carriage moving assembly moves the carriage 23 for scanning in a main scanning direction via a timing belt looped between a driving pulley and a driven pulley.

The carriage 23 mounts, for example, recording heads 24*a* and 24*b* (referred to as “recording heads 24” unless distinguished) serving as liquid ejection heads to eject ink droplets of different colors, e.g., yellow (Y), magenta (M), cyan (C), and black (K).

The recording heads 24*a* and 24*b* having nozzle rows are mounted on the carriage 23 so that multiple nozzles forming each of the nozzle rows are arrayed in line in a sub scanning direction perpendicular to the main scan direction and ink droplets are horizontally ejected from the nozzles. In other words, the image forming apparatus employs a horizontal ejection method in which a nozzle face having multiple nozzles in each recording head 24 is oriented in the vertical direction to horizontally eject liquid droplets.

Each recording head 24 has, for example, two nozzle rows, each of which multiple nozzles are arrayed in line to eject liquid droplets. For example, the recording head 24*a* ejects droplets of yellow (Y) from one of the nozzle rows and droplets of magenta (M) from the other of the nozzle rows. In addition, the recording head 24*b* ejects droplets of black (K) from one of the nozzle rows and droplets of cyan (C) from the other of the nozzle rows.

The carriage 23 mounts head tanks 29 to supply the respective color inks to the corresponding nozzle rows of the recording heads 24.

A supply unit 200 is disposed at a back face side of the carriage 23 to supply inks to the head tanks 29. The supply unit 200 has a cartridge unit 201 to replaceably accommodate ink cartridges 100 serving as liquid cartridges and a supply pump 202 to deliver ink stored in the ink cartridges 100. The supply pump 202 delivers ink to the recording heads 24 via a supply tube 203.

A maintenance unit 9 is disposed below the image forming device 2 and the supply unit 200 at a position opposite a position of the conveyance assembly 5 via the image forming device 2. The maintenance unit 9 serves as a maintenance device to perform maintenance operations to maintain and recover good conditions of the recording heads 24.

The sheets 10 in the feed tray 4 are separated by a sheet feed roller (half-moon-shaped roller) 43 and a separation pad 44 and fed sheet by sheet into the apparatus body 1. The sheet 10 is sent along a conveyance guide member 45 to between a conveyance belt 51 and a regulation roller 48, and attached to and conveyed by the conveyance belt 51.

The conveyance assembly 5 includes, e.g., the conveyance belt 51, a conveyance roller 52, a driven roller 53, and a charging roller 54. The conveyance belt 51 has an endless shape and is looped around the conveyance roller 52, serving as a driving roller, and the driven roller 53. The charging roller 54 charges the conveyance belt 51. The conveyance assembly 5 also has a platen member 55, a conveyance roller 56, and a spur wheel 58. The platen member 55 is disposed at a position opposing the image forming device 2 to maintain flatness of the conveyance belt 51. The conveyance roller 56 is disposed opposing the spur wheel 58.

The conveyance roller 52 is rotated by a sub-scanning motor via a timing belt and a timing pulley. By rotation of the conveyance roller 52, the conveyance belt 51 is moved for circulation in a belt conveyance direction (also referred to as sub-scanning direction or sheet conveyance direction).

The output conveyance unit 6 includes an output guide member 61, an output conveyance roller 62, a spur wheel 63, an output conveyance roller 66, a spur wheel 67, an output roller 64, and a spur wheel 65. The output conveyance unit 6 discharges the sheet 10 having an image formed, from between the output roller 64 and the spur wheel 65 onto the output tray 7 in a face-down manner.

The reverse unit 8 sends the sheet 10, which is partially discharged to the output tray 7, back to between the conveyance belt 51 and the regulation roller 48 while turning the sheet 10 upside down in a switchback manner. The reverse unit 8 has a switching claw 81 to switch between an output passage and a reverse passage, a reverse guide member 82, a conveyance roller 83, and a spur wheel 84 serving as a reverse roller.

The reverse unit 8 also has an auxiliary conveyance roller 85 opposing the driven roller 53 and an auxiliary conveyance roller 87 opposing the conveyance roller 52. The reverse unit 8 also has a bypass guide member 86. When the sheet 10 is separated from between an opposite conveyance area of the conveyance belt 51 (in which the sheet 10 is conveyed in a direction opposite the sheet conveyance direction) and the auxiliary conveyance roller 87, the bypass guide member 86 guides the sheet 10 to between the conveyance belt 51 and the regulation roller 48.

In the image forming apparatus having the above-described configuration, the sheet 10 is separately fed from the feed tray 4, is electrostatically attached onto the conveyance belt 51 charged by the charging roller 54, and conveyed in the vertical direction by the circulation of the conveyance belt 51. By driving the recording heads 24 in accordance with image signals while moving the carriage 23, ink droplets are ejected onto the stopped sheet 10 to form one line of a desired image. The sheet 10 is fed by a certain distance to prepare for recording another line of the image. After the recording of the image is completed, the sheet 10 is discharged to the output tray 7.

For duplex printing, a first face of a sheet 10 is printed in the same manner as described above. When a rear edge of the sheet 10 passes a branching part (switching claw 81) of the reverse unit 8, the output roller 64 is rotated in reverse to switch the sheet 10 back. Further, the sheet 10 is guided toward the reverse guide member 82, conveyed to between the conveyance roller 83 and the spur wheel 84, and sent into between the opposite conveyance area of the conveyance belt 51 and the auxiliary conveyance roller 85.

As a result, the sheet 10 is attached onto the conveyance belt 51 by static electricity, conveyed by the circulation of the conveyance belt 51, separated from the conveyance belt 51 at the conveyance roller 52, guided by the bypass guide member 86, and sent into between the normal conveyance area of the conveyance belt 51 and the regulation roller 48. Then, the sheet 10 is adhered onto the conveyance belt 51 and conveyed again to an image formation area in which image formation is performed by the recording heads 24. After a second face of the sheet 10 is printed, the sheet 10 is output to the output tray 7.

Next, an opening configuration of a conveyance unit of the image forming apparatus according to an exemplary embodiment of this disclosure is described below.

At a front face side of the apparatus body 1, the front cover 101 serving as an opening and closing cover is disposed so as to be openable and closable around a support shaft 102 serving as a fulcrum disposed at a lower end of the front cover 101. On the front cover 101 are mounted a guide member 103 to form a reverse passage, the conveyance roller 83, and the auxiliary conveyance rollers 85 and 87.

The conveyance belt 51, the conveyance roller 52, the driven roller 53, the conveyance roller 56, and the platen member 55 are integral parts of a conveyance unit 300. The conveyance unit 300 is openable and closable (swingable) around a support shaft 52*a* of the conveyance roller 52 serving as a fulcrum.

Thus, by opening the front cover 101 and the conveyance unit 300, an opening 301 is formed at the front face side in the apparatus body 1. The ink cartridges 100 are inserted into and extracted from the cartridge unit 201 through the opening 301.

Next, a maintenance configuration according to an exemplary embodiment of this disclosure is described with reference to FIGS. 5A and 5B.

Figure 5A:
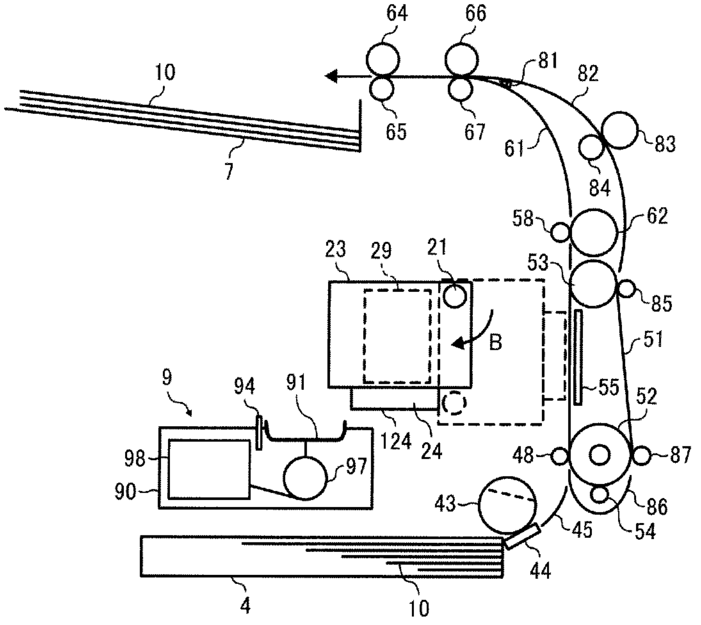
FIGS. 5A and 5B are side views of movement of a carriage and a maintenance unit in exemplary embodiments of this disclosure.
Figure 5B:
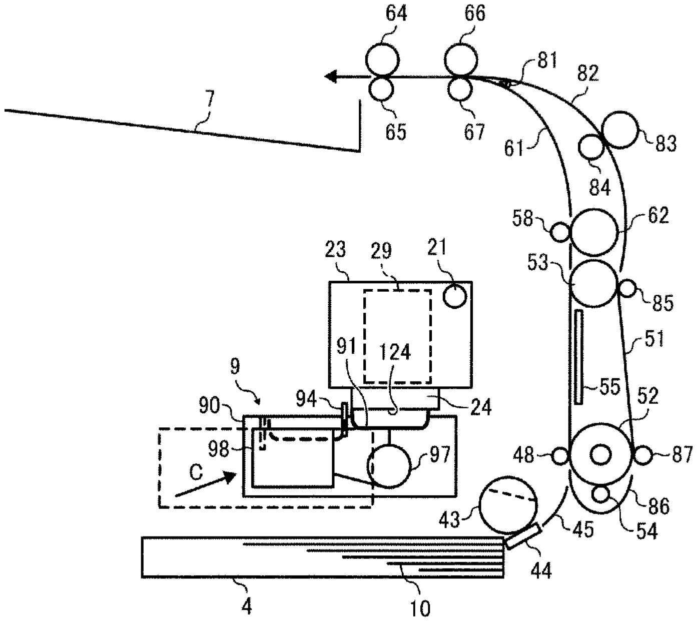

FIGS. 5A and 5B are side views of the carriage and the maintenance unit in movement.

In FIGS. 5A and 5B, the maintenance unit 9 is disposed below the image forming device 2 and at a position opposite a position of the conveyance assembly 5 via the image forming device 2. The maintenance unit 9 serves as a maintenance device to perform maintenance operations to maintain and recover good conditions of the recording heads 24.

The feed tray 4 (feed unit) 4 is disposed below the apparatus body 1 to feed a recording medium (sheet 10). At an upper portion of the apparatus body 1 is disposed the output tray 7 serving as the output unit onto which the recording medium having an image formed by the image forming device 2 is discharged. The image forming device 2 and the maintenance unit 9 are disposed in a space surrounded by the feed tray 4, the output tray 7, and the conveyance assembly 5. The maintenance unit 9 is disposed below the image forming device 2.

The maintenance unit 9 has a frame 90 provided with caps 91 to cap nozzle faces 124 of the recording heads 24 and a wiping member (wiping blade) 94 to wipe the nozzle faces 124 of the recording heads 24. The maintenance unit 9 also has, e.g., a suction pump 97 serving as a suction device connected to the caps 91 and a waste liquid tank 98 connected to the suction pump 97.

The carriage 23 mounting the recording heads 24 of the image forming device 2 is displaceable between an image forming position indicated by a broken line in FIG. 5A and a maintenance position indicated by a solid line in FIGS. 5A and 5B. The recording heads 24 horizontally eject liquid droplets at the image forming position and are opposable to the maintenance unit 9 at the maintenance position.

In the configuration of FIGS. 5A and 5B, since the maintenance unit 9 is disposed lower than the image forming device 2, the recording heads 24 are rotated by substantially 90 degrees downward from the image forming position to the maintenance position so that the nozzle faces 124 are directed downward.

The driving motor (main scanning motor) moves the carriage 23 for scanning in the main scanning direction. Driving force of the main scanning motor is transmitted via a clutch assembly to rotate the carriage 23, thus resulting in a reduced number of components.

The maintenance unit 9 is movable between a maintenance position indicated by the solid line in FIG. 5B and a retracted position indicated by a solid line in FIG. 5A (i.e., a broken line in FIG. 5B). The caps 91 cap the nozzle faces 124 of the recording heads 24 at the maintenance position. The maintenance unit 9 is retracted from the maintenance position to the retracted position.

The driving motor (sub-scanning motor) moves the conveyance belt 51 in the sub-scanning direction. Driving force of the sub-scanning motor is transmitted via a clutch assembly to move the maintenance unit 9, thus resulting in a reduced number of components.

Next, movement of the carriage 23 and the maintenance unit 9 is described below.

For example, when nozzles of the recording heads 24 are clogged or when negative pressure in the head tanks 29 is not maintained and thus menisci of nozzles are broken, cleaning operation (maintenance operation) is performed. The cleaning operation includes, e.g., sucking operation, wiping operation, and dummy ejection operation. The sucking operation is performed, for example, in an order of capping, ink suction, decapping, and suction of the interior of the caps.

As illustrated in FIG. 5A, the carriage 23 is rotated by substantially 90 degrees in a direction indicated by an arrow B from the image forming position indicated by the broken line to the maintenance position indicated by the solid line. Thus, the nozzle faces 124 are moved so as to direct downward.

Then, as illustrated in FIG. 5B, the maintenance unit 9 is moved obliquely upward in a direction indicated by an arrow C from the retracted position to the maintenance position, to cap the nozzle faces 124 of the recording heads 24 with the caps 91. Alternatively, in some embodiments, after the maintenance unit 9 is moved vertically upward, the maintenance unit 9 is horizontally moved.

The suction pump 97 is driven to suck a predetermined amount of liquid (ink) from the nozzles of the recording heads 24 into the caps 91, thus discharging liquid into the caps 91.

The maintenance unit 9 is moved to a position at which the caps 91 are placed away (decapped) from the nozzle faces 124 of the recording heads 24.

The suction pump 97 is activated again to suck residual waste liquid remaining in the caps 91 to discharge the waste liquid into the waste liquid tank 98.

Then, the wiping member 94 is moved to a wipable position at which the wiping member 94 can wipe the nozzle faces 124 of the recording heads 24, and starts to wipe the nozzle faces 124. A wiping direction of the wiping member 94 may be any of a longitudinal direction and a lateral direction relative to the nozzle rows.

After the wiping member 94 wipes the nozzle faces 124, the caps 91 are placed under the nozzle faces 124 of the recording heads 24 and the recording heads 24 perform dummy ejection to eject droplets to the inside of the caps 91. After the dummy ejection, the suction pump 97 is activated to suck waste liquid from the inside of the caps 91 and discharge the waste liquid into the waste liquid tank 98.

The maintenance unit 9 is moved obliquely downward to the retracted position indicated by the solid line in FIG. 5A.

As described above, the maintenance unit 9 is disposed within the space surrounded by the feed tray 4, the output tray 7, and the conveyance assembly 5 and at a side opposite the conveyance assembly 5 via the image forming device 2 (a side opposite the droplet ejected direction with respect to the recording heads 24). Such a configuration reduces the size of the apparatus body in the width direction, thus allowing downsizing.

In addition, the caps 91 of the maintenance unit 9 are directed upward. Such a configuration prevents liquid from leaking from the caps 91 even when liquid is discharged into the caps 91.

In other words, if, with the nozzle faces 124 held in a vertical state and capped with caps, liquid is discharged into the caps, waste liquid would drip down from the caps when the caps are decapped from the nozzle faces 124. Hence, for example, it is conceivable to provide the caps with air release valves to release liquid from the inside of the caps and then open the inside of the caps relative to the atmosphere. After the inside of the caps is opened to the atmosphere, waste liquid remaining in the caps is sucked and discharged by the suction pump, and then the caps are decapped from the nozzle faces. Consequently, the configuration and operation are complicated and, even when waste liquid in the caps is discharged by suction, residual waste liquid might remain in the caps, thus resulting in dropping of waste liquid from the caps.

By contrast, in the above-described configuration, liquid is discharged into the caps 91 with the caps 91 directed upward, thus preventing waste liquid from dropping from the caps.

Next, a normal action conducted (or controlled by a first controller) when the openable cover is opened is described with reference to FIGS. 6A to 11B.

Figure 6A:
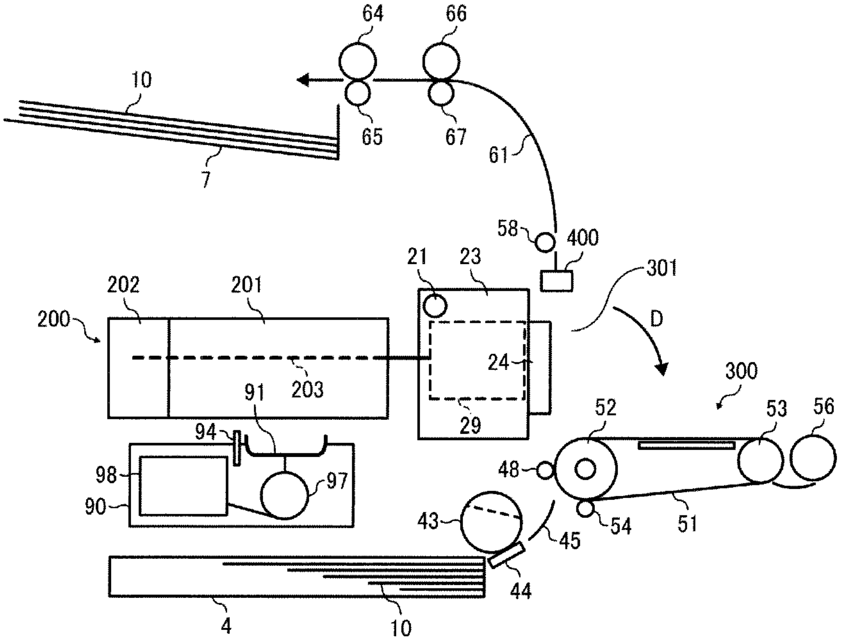
FIGS. 6A and 6B are side views of movement of a supply unit in exemplary embodiments of this disclosure.
Figure 6B:
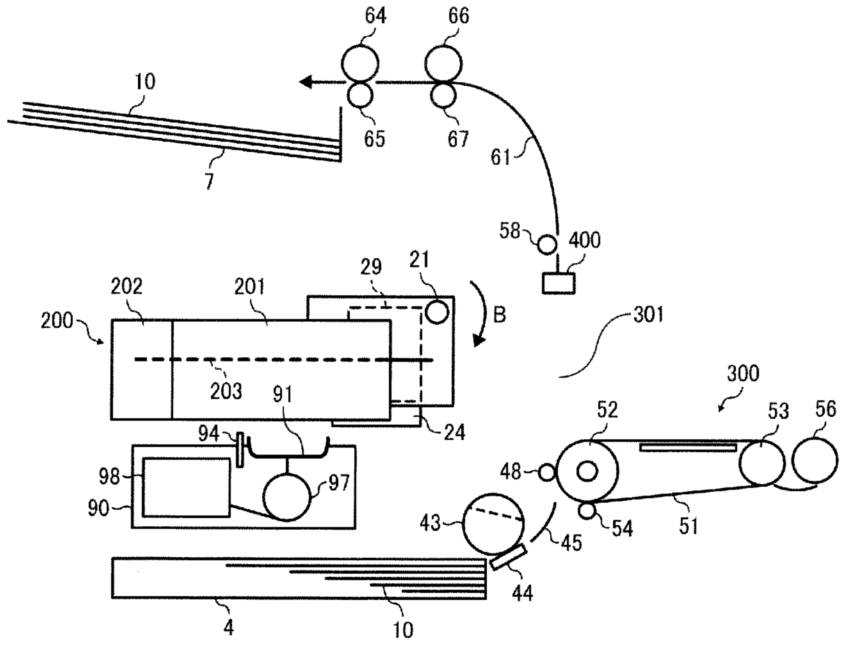
Figure 7:
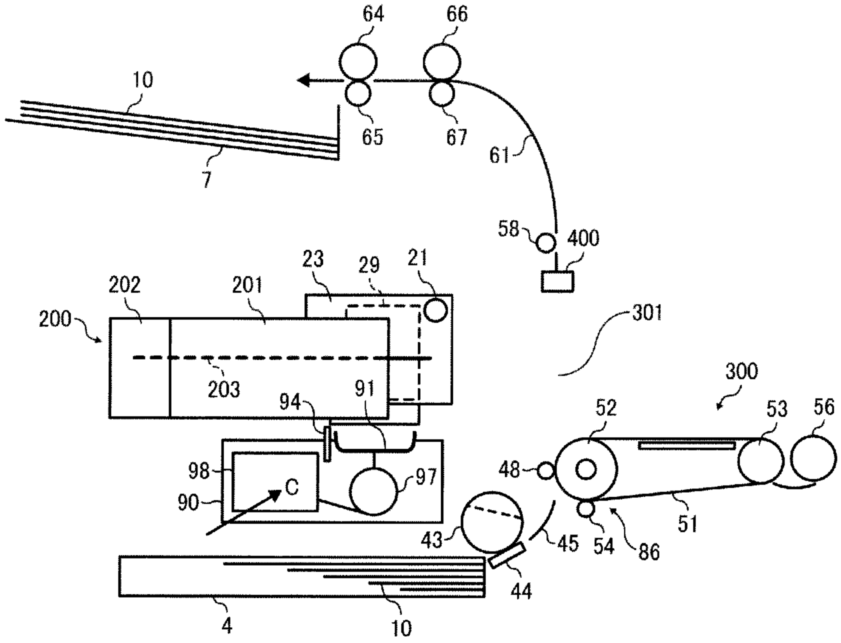
FIG. 7 is a side view of movement of the supply unit.
Figure 8A:
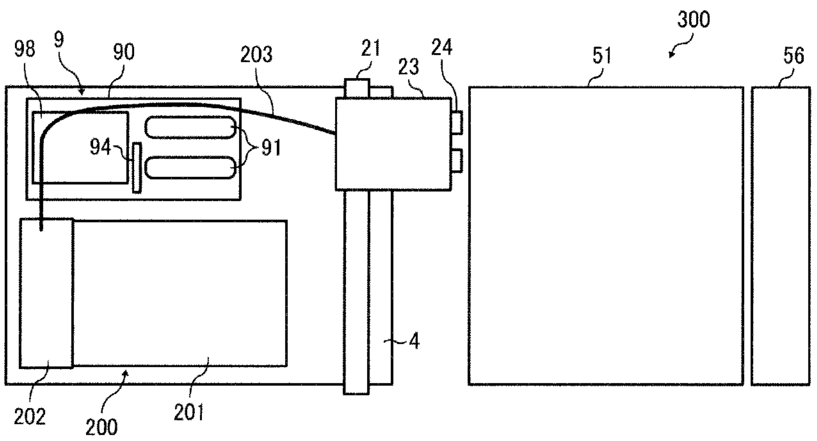
FIGS. 8A and 8B are plan views of movement of the supply unit.
Figure 8B:
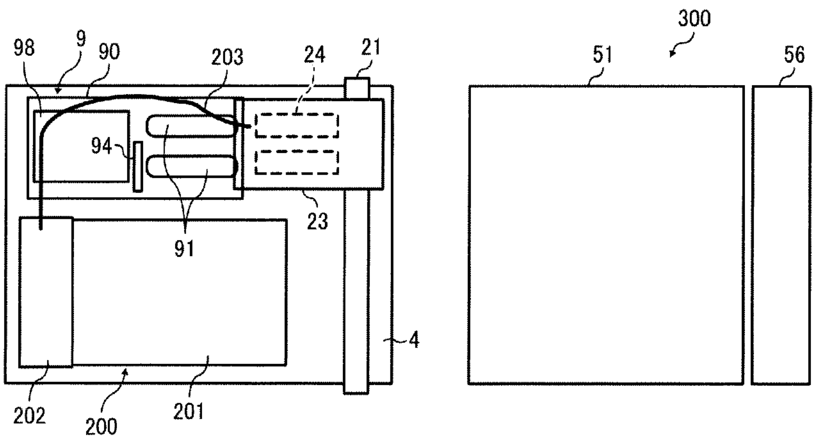
Figure 9:
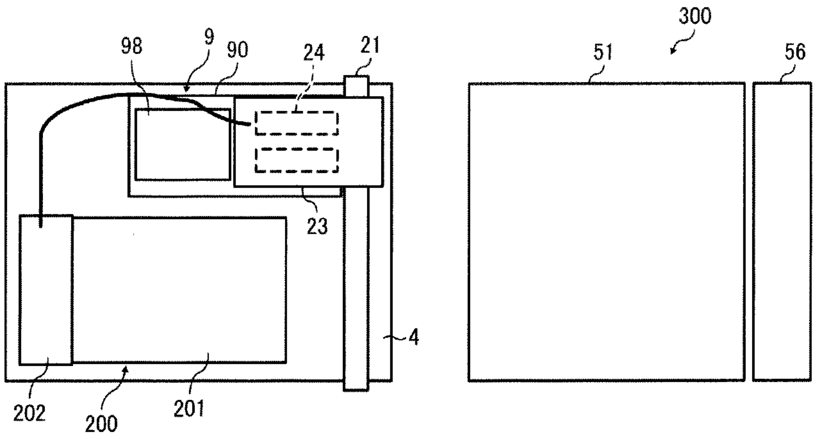
FIG. 9 is a plan view of movement of the supply unit.
Figure 10A:
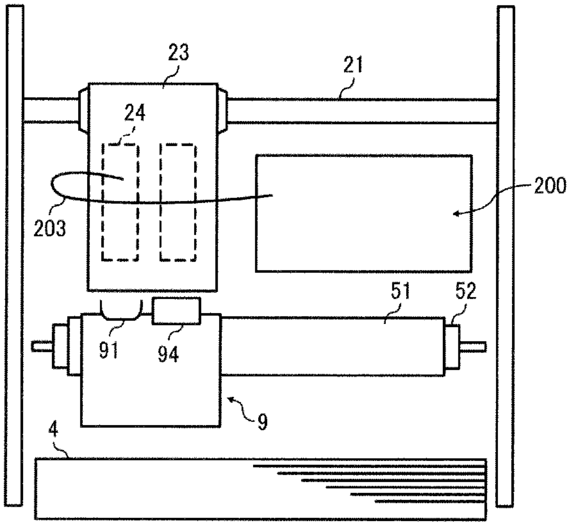
FIGS. 10A and 10B are back views of movement of the supply unit.
Figure 10B:
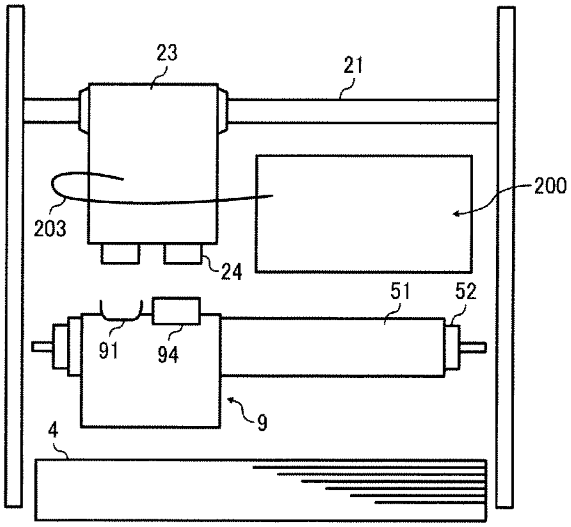
Figure 11:
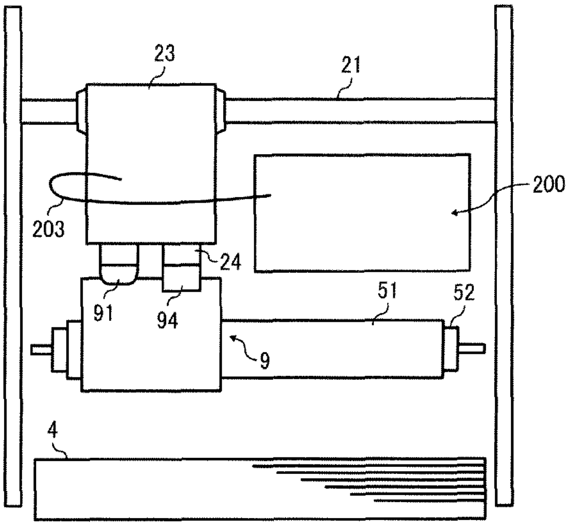
FIG. 11 is a back view of movement of the supply unit.

FIGS. 6A, 6B, and 7 are side views of an image forming apparatus according to exemplary embodiments of this disclosure. FIGS. 8A, 8B, and 9 are plan views of the image forming apparatus. FIGS. 10A, 10B, and 11 are plan views of the image forming apparatus.

As illustrated in FIG. 6A, FIG. 8A, and FIG. 10A, when a user opens the front cover 101 in a direction indicated by an arrow D, a front-cover opening-and-closing sensor 400 serving as a cover sensor detects that the front cover 101 is opened and the conveyance unit 300 is opened.

When the front cover 101 is opened and the conveyance unit 300 is opened, the opening 301 is formed at the front side of the apparatus body 1.

Then, as illustrated in FIG. 8A, the carriage 3 is moved toward the maintenance unit 9 (to the home position).

As illustrated in FIG. 6B, the carriage 3 is rotated by substantially 90 degrees in the direction indicated by the arrow B and moved so as to direct the nozzle faces 124 downward (see also FIGS. 8B and 10B).

Next, as illustrated in FIG. 7, the maintenance unit 9 is moved obliquely upward in the direction indicated by the arrow C to cap the nozzle faces 124 of the recording heads 24 (see also FIGS. 9 and 11).

Next, a controller of the image forming apparatus in exemplary embodiments of this disclosure is described with reference to FIG. 12.

Figure 12:
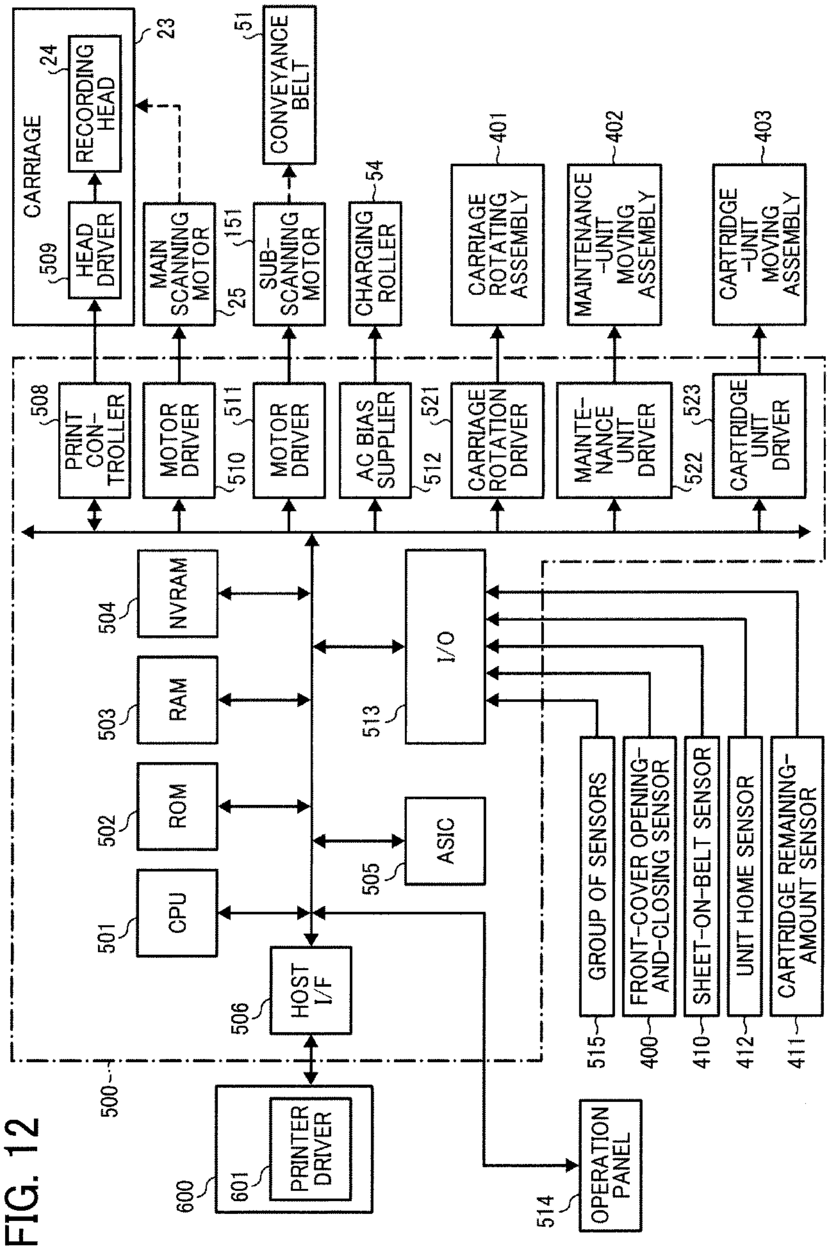
FIG. 12 is a schematic block diagram of a controller of an image forming apparatus in exemplary embodiments of this disclosure.

FIG. 12 is a block diagram of a controller 500 of the image forming apparatus according to exemplary embodiments of this disclosure.

The controller 500 includes a central processing unit (CPU) 501, a read-only memory (ROM) 502, a random access memory (RAM) 503, a rewritable non-volatile random access memory (NVRAM) 504, and an application specific integrated circuit (ASIC) 505. The CPU 501 controls the entire image forming apparatus. The ROM 502 stores programs, including programs causing the CPU 501 to perform control processing according to exemplary embodiments described below, and other fixed data. The RAM 503 temporarily stores image data or other data.

The rewritable non-volatile memory 504 retains data even while the apparatus is powered off. The ASIC 505 processes image data signals, performs image processing, e.g., sorting, or processes input and output signals for controlling the entire image forming apparatus.

The controller 500 also includes a print controller 508, a head driver (driver IC) 509, a motor driver 510, a motor driver 511, and an alternating current (AC) bias supplier 512. The print controller 508 includes a data transmitter and a driving signal generator to drive and control the recording heads 24 in accordance with print data. The head driver 509 drives the recording heads 24 mounted on the carriage 23.

The motor driver 510 drives the main scanning motor 25 for moving the carriage 23, and the motor driver 511 drives the sub-scanning motor 151 for circulating the conveyance belt 51. The AC bias supplier 512 supplies AC bias to the charging roller 54.

The controller 500 further includes a carriage rotation driver 521, a maintenance-unit driver 522, and a cartridge-unit driver 523. The carriage rotation driver 521 drives a carriage rotating assembly 401 to rotate the carriage 3 around the main guide member 21. The maintenance-unit driver 522 drives a maintenance-unit moving assembly 402 to move the maintenance unit 9. The cartridge-unit driver 523 drives a cartridge-unit moving assembly 403 to move the cartridge unit 201.

The controller 500 is connected to an operation unit 514 (e.g., operation panel) to input and display information necessary to the image forming apparatus. The operation unit 514 forms part of an instruction unit to instruct shift to special control according to exemplary embodiments of this disclosure.

The controller 500 includes an interface (I/F) 506 to transmit and receive data and signals to and from a host 600, such as an information processing device (e.g., personal computer) via a cable or network.

The CPU 501 of the controller 500 reads and analyzes print data stored in a reception buffer of the I/F 506, performs desired image processing, data sorting, or other processing with the ASIC 505, and transmits image data to the head driver 509. It is to be noted that dot-pattern data for image output may be created by a printer driver 601 of the host 600.

The print controller 508 transmits the above-described image data as serial data and outputs to the head driver 509, for example, transfer clock signals, latch signals, and control signals required for the transmission of print data and determination of the transmission. The print controller 508 further includes a driving signal generator including, e.g., a digital/analog (D/A) converter to convert pattern data of driving pulses stored in the ROM 502 from digital to analog, a voltage amplifier, and a current amplifier. From the driving signal generator, driving signals of one or more driving pulses are output to the head driver 509.

In accordance with serially-input image data corresponding to one line of a desired image recorded by the recording heads 24, the head driver 509 selectively applies driving pulses constituting a driving signal transmitted from the print controller 508, to the recording heads 24 to drive the recording heads 24. At this time, by selecting driving pulses constituting the driving signal, liquid droplets of different liquid amounts, such as large-size droplets, medium-size droplets, and small-size droplets, can be selectively ejected to form different sizes of dots.

The I/O unit 513 obtains information from a group of sensors 515 mounted on a main scanning encoder, a sub-scanning encoder, and other devices. Information for controlling devices is extracted and used to control the print controller 508, the motor driver 510 and 511, and the AC bias supplier 512.

The I/O unit 513 also obtains information from the front-cover opening-and-closing sensor 400 to detect opening and closing of the front cover 101, a sheet-on-belt sensor 410 (serving as a media sensor) to detect whether a sheet is placed on the conveyance belt 51, and a cartridge remaining-amount sensor 411 to detect an amount of ink remaining in the ink cartridges 100. Information for controlling devices is extracted and used to control, e.g., the carriage rotation driver 521, the maintenance-unit driver 522, and the cartridge-unit driver 523.

The group of sensors 515 includes, for example, a sheet sensor to detect a sheet, a thermistor to monitor temperature and/or humidity in the apparatus body 1, and a voltage sensor to monitor the voltage of the conveyance belt charged. The I/O unit 513 processes information from such various types of sensors.

The controller 500 also serves as a control unit according to exemplary embodiments of this disclosure. When the image forming apparatus is on standby or the front cover 101 is open as described above, the controller 500 normally controls operation (referred to as normal operation) of capping the nozzle faces of the recording heads 24 with the caps 91 of the maintenance unit 9. When the front cover 101 is opened during printing, the carriage 23 is moved to the maintenance unit 9 (home position) to cap the nozzle faces of the recording heads 24 with the caps 91.

As described above, when the front cover 101 is opened, normally, the nozzle faces of the recording heads 24 are capped with the caps 91, thus hampering a service person from touching or checking the nozzle faces.

By contrast, when the controller 500 receives an instruction from outside, the controller 500 performs control (referred to as special control) to expose the nozzle faces of the recording heads 24 to an area (the opening 301) opened by the front cover 101. A state in which the image forming apparatus is under the special control is referred to as "special control mode".

Figure 13:
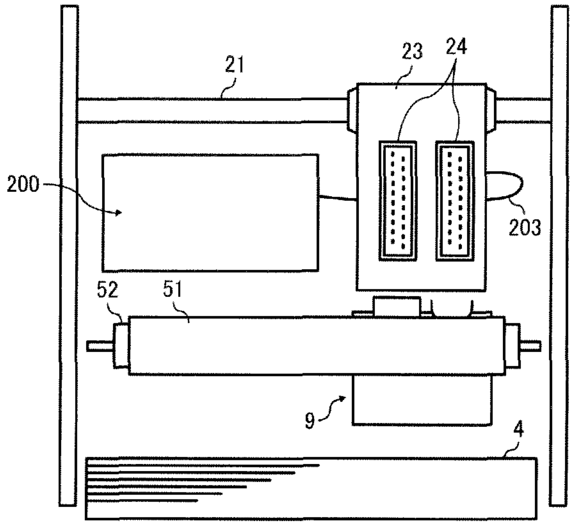
FIG. 13 is a front view of an apparatus body in a special control mode according to an exemplary embodiment of this disclosure.

In the special control mode, as illustrated in FIG. 13, the caps 91 are detached (decapped) from the nozzle faces 124 of the recording heads 24. By rotating the carriage 23, the controller 500 controls the nozzle faces 124 of the recording heads 24 to face an area from the opening 301 to the front side of the apparatus body.

Then, by opening the front cover 101, the nozzle faces 124 of the recording heads 24 are exposed to the opening 301 (see FIG. 7), thus facilitating a service person to check and clean the nozzle faces 124.

As described above, in this exemplary embodiment, the image forming apparatus has a controller to perform special control to expose the nozzle faces of the recording heads to an area opened by the openable cover when the controller 500 receives an external instruction, thus facilitating cleaning work of the nozzle faces of the recording heads.

Figure 14:
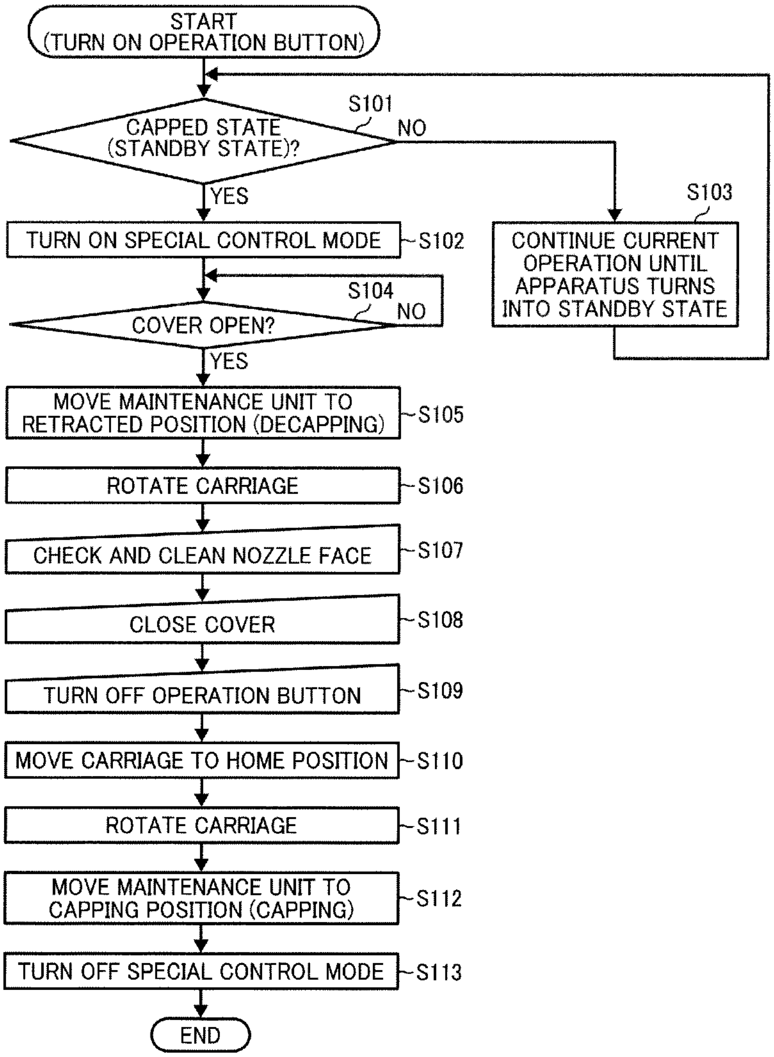
FIG. 14 is a flowchart of a procedure of processing in a special control mode according to an exemplary embodiment of this disclosure.

Next, a processing procedure of the special control mode according to an exemplary embodiment of this disclosure is described with reference to FIG. 14.

When a certain operation key of the operation unit 514 is turned on (YES at S101), at S101 the controller 500 determines whether or not the nozzle faces 124 of the recording heads 24 are capped (i.e., the image forming apparatus is on standby).

If the image forming apparatus is not on standby (NO at S101), at S103 the controller 500 continues current operation until the image forming apparatus turns into a standby state. For example, during printing, the controller 500 waits until the current print job ends, or during occurrence of an error, the controller 500 waits until the error is cleared.

When the image forming apparatus is on standby or turns into the standby state (YES at S101), at S102 the controller 500 starts the special control and shifts to the special control mode (turns on the special control mode).

As described above, by handling the certain operation key on the operation unit 514, the image forming apparatus can be turned into the special control mode, thus reducing the operation time with a simple configuration. It is to be noted that the certain operation key to instruct the special control may be preferably a combination of keys not used in the normal mode or the special control may be instructed by pushing the certain key for a long seconds.

At S104, the controller 500 determines whether or not the front cover 101 is opened in the special control mode.

When the front-cover opening-and-closing sensor 400 detects that the front cover 101 is opened (YES at S104), at S105 the controller 500 controls the maintenance unit 9 to move to the retracted position and release capping of the nozzle faces 124 with the caps 91 (decapping). At S106, the controller 500 rotates the carriage 23 to expose the nozzle faces 124 of the recording heads 24 to the area from the opening 301 to the front side of the apparatus body 1.

In such a state, at S107, a service person can check and clean the nozzle faces 124 of the recording heads 24.

When the front cover 101 is closed at S108 and the certain key on the operation unit 514 is operated (turned off) at S109, at S110 the controller 500 causes the carriage 23 to move to the home position.

At S111, the controller 500 causes the carriage 23 to rotate. At S112, the controller 500 causes the maintenance unit 9 to move to the maintenance position and cap the nozzle faces 124 with the caps 91.

At S113, the controller 500 cancels the special control mode (turns off the special control mode).

To cancel the special control mode, the same key as the certain key to instruct the start of the special control mode may be employed or a power key may be employed. In the case of using the power key, the controller 500 do not power off hardware until the processing of the special control mode ends.

In addition, when a print job is received (i.e., printing is instructed) during execution of the special control mode, the controller 500 preferably starts the print job after the special control mode is canceled. Such a configuration prevents a conveyance error that might be otherwise caused by conveying a sheet with the front cover 101 including the conveyance assembly 5 open, and also prevents ink droplets from being ejected from the nozzle faces 124 exposed the area from the opening 301 to the front side of the apparatus body 1.

Figure 15:
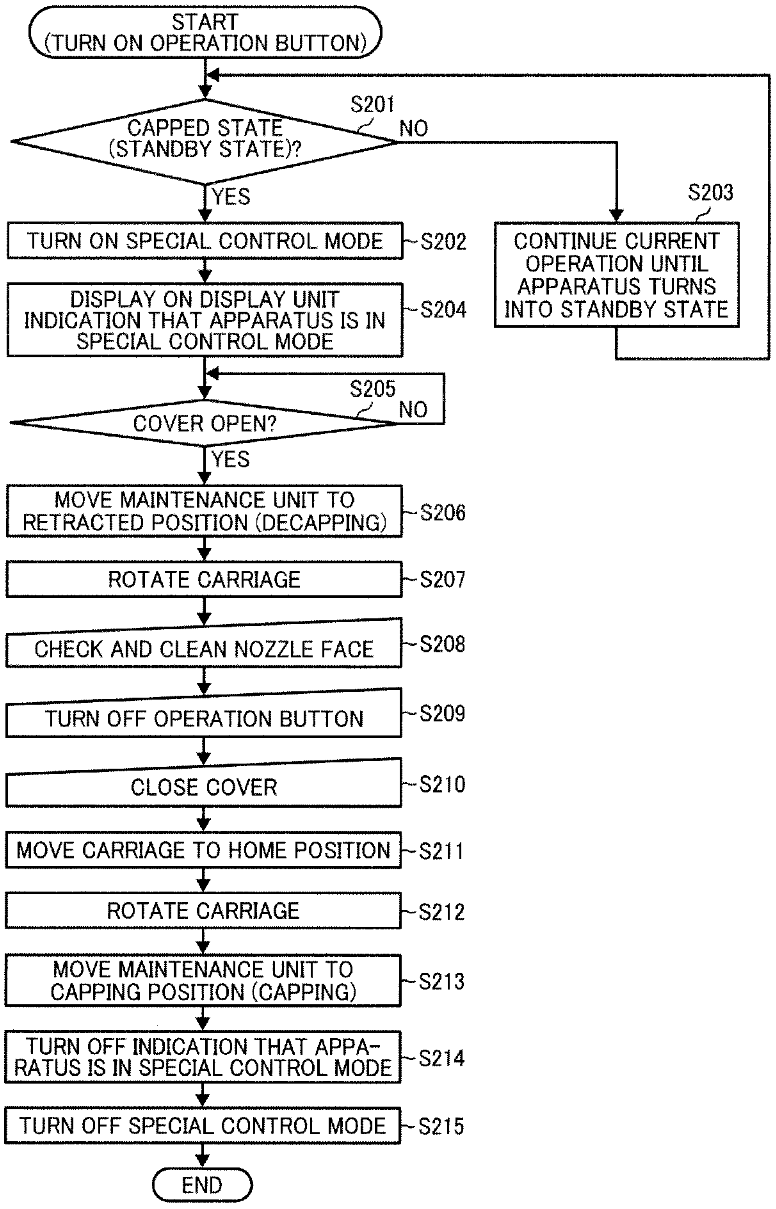
FIG. 15 is a flowchart of a procedure of processing in a special control mode according to an exemplary embodiment of this disclosure.

Next, a processing procedure of the special control mode according to an exemplary embodiment of this disclosure is described with reference to FIG. 15.

For this exemplary embodiment illustrated in FIG. 15, in the above-described exemplary embodiment described with reference to FIG. 14, when the special control mode is turned on, the controller 500 displays on a display part (e.g., display part 514*a* in FIG. 18) of the operation unit 514 an indication that the image forming apparatus is in the special control mode. When the special control mode is canceled, the controller 500 turns off the indication that the image forming apparatus is in the special control mode.

Specifically, in this exemplary embodiment illustrated in FIG. 15, the processing of S201 to S203 is conducted in the same manner as that of S101 to 103 in the above-described exemplary embodiment described with reference to FIG. 14. When the special control mode is turned on at S202, at S204 the controller 500 displays, on the display part of the operation unit 514, the indication that the image forming apparatus is in the special control mode. The processing from S205 to 213 is conducted in the same manner as S104 to 112, respectively. At S214, the controller 500 turns off the indication on the display part that the image forming apparatus is in the special control mode. At S215, the controller 500 cancels the special control mode.

As described above, displaying on the display part the indication that the image forming apparatus is in the special control mode prevents a user from accidentally touching the nozzle faces as the user forgets canceling the special control mode.

Figure 16:
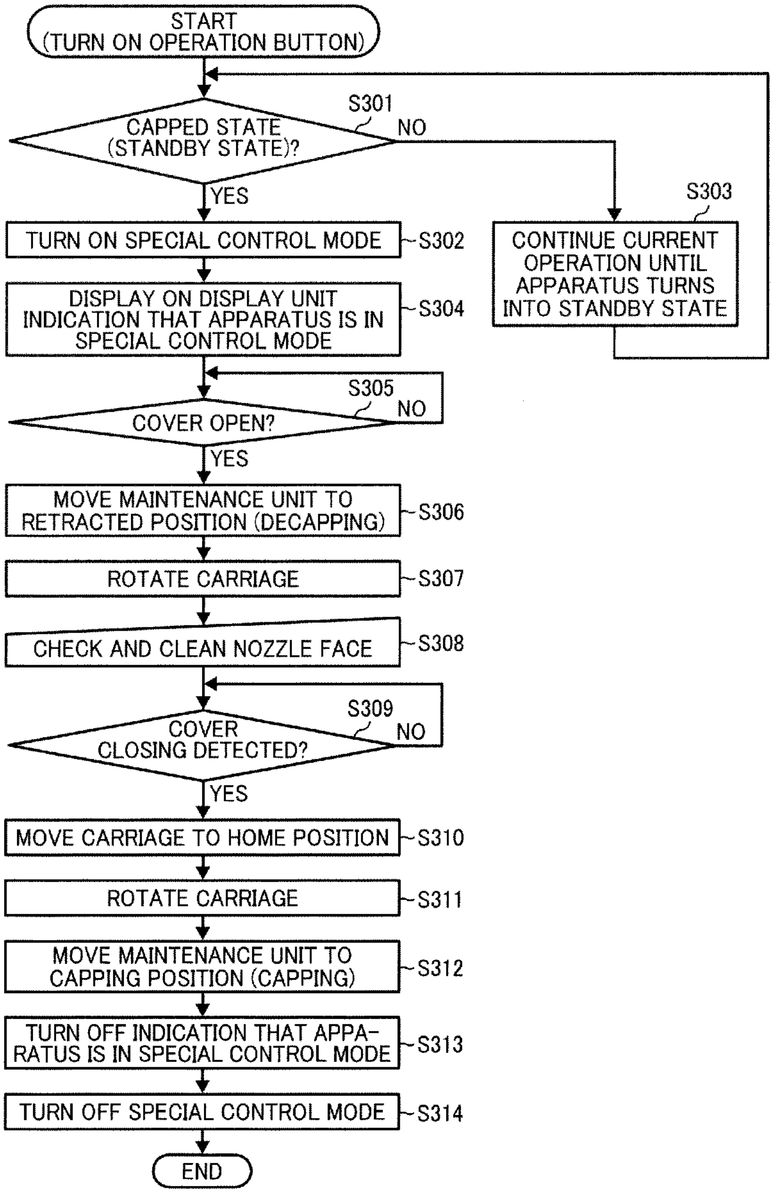
FIG. 16 is a flowchart of a procedure of processing in a special control mode according to an exemplary embodiment of this disclosure.

Next, a processing procedure of the special control mode according to an exemplary embodiment of this disclosure is described with reference to FIG. 16.

For this exemplary embodiment illustrated in FIG. 16, in the above-described exemplary embodiment described with reference to FIG. 15, when the front-cover opening-and-closing sensor 400 detects that the front cover 101 is closed, the controller 500 cancels the special control mode. Specifically, in this exemplary embodiment illustrated in FIG. 16, the processing of S301 to S308 is conducted in the same manner as that of S201 to 208 in the above-described exemplary embodiment described with reference to FIG. 15. When, at S309, the front-cover opening-and-closing sensor 400 detects that the front cover 101 is closed (YES at S309), the controller 500 performs the processing from S310 to 312 in the same manner as S211 to 213 of FIG. 15, respectively. At S313, the controller 500 turns off the indication on the display part that the image forming apparatus is in the special control mode. At S314, the controller 500 cancels the special control mode.

Such a configuration obviates pushing the certain key on the operation unit 514 again in canceling the special control mode. Thus, such a configuration allows easier operation of a service person and prevents a user from accidentally touching the nozzle faces as the user forgets canceling the special control mode.

Figure 17:
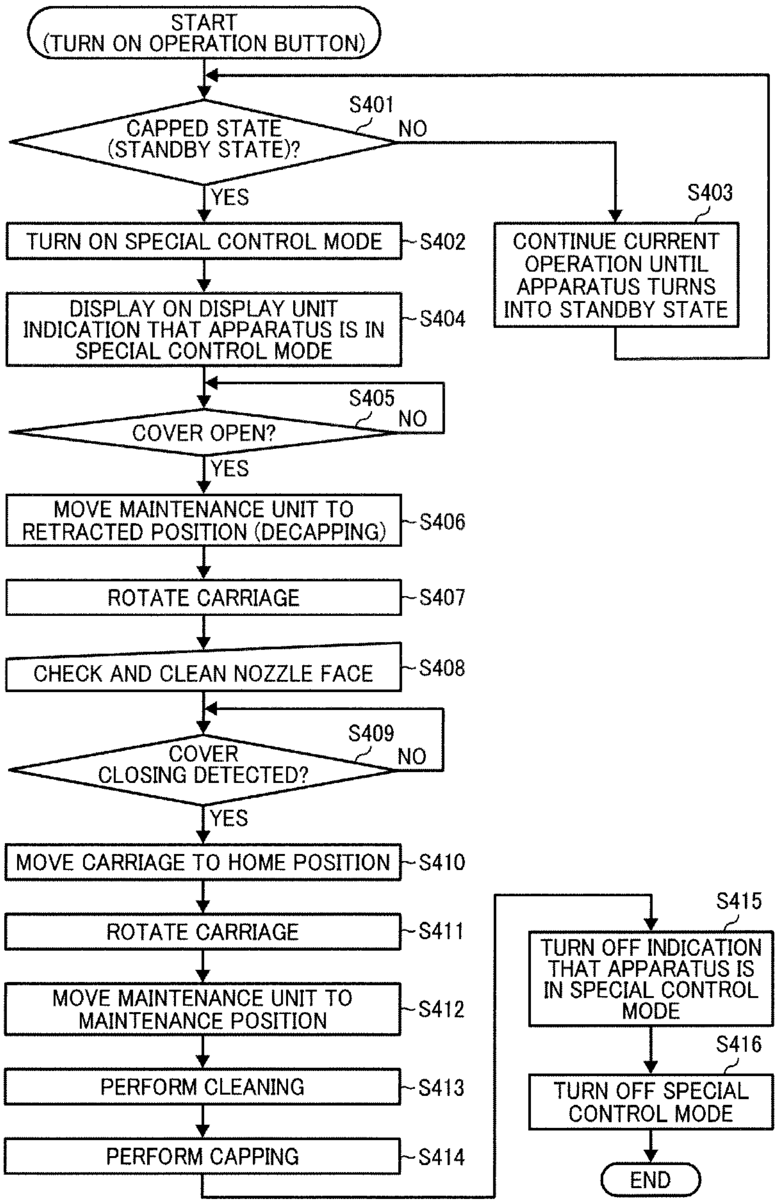
FIG. 17 is a flowchart of a procedure of processing in a special control mode according to an exemplary embodiment of this disclosure.

Next, a processing procedure of the special control mode according to an exemplary embodiment of this disclosure is described with reference to FIG. 17.

For this exemplary embodiment illustrated in FIG. 17, in the above-described exemplary embodiment described with reference to FIG. 16, when the controller 500 cancels the special control mode after the front cover 101 is closed, the controller 500 performs cleaning operation and then capping operation. Specifically, in this exemplary embodiment illustrated in FIG. 17, the processing of S401 to S411 is conducted in the same manner as that of S301 to 311 in the above-described exemplary embodiment described with reference to FIG. 16. After the controller 500 causes the maintenance unit 9 to move to the maintenance position at S412, at S413 the controller 500 causes the wiper member 94 to clean the nozzle faces 124 of the recording heads 24. At S414, the controller 500 causes the caps 91 to cap the nozzle faces 124 of the recording heads 24. At S415, the controller 500 turns off the indication on the display part that the image forming apparatus is in the special control mode. At S416, the controller 500 cancels the special control mode.

Such a configuration prevents occurrences of ejection failure and non-ejection nozzles that might be otherwise caused by drying of nozzles due to exposure of the nozzle faces during the special control mode.

Next, an example of the operation panel 514 to instruct shift to or canceling of the special control mode in the above-described exemplary embodiments is described with reference to FIG. 18.

Figure 18:
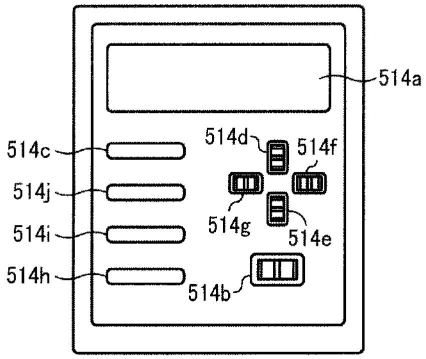
FIG. 18 is a schematic view of an example of an operation panel to instruct shift to and canceling of a special control mode in exemplary embodiments of this disclosure.

In the example illustrated in FIG. 18, the operation panel 514 includes a display part 514*a* and operation keys. The display part 514*a* displays various types of information. The operation keys include, for example, a power key 514*b*, a menu key 514*c*, an upward key 514*d*, a downward key 514*e*, an enter key 514*f*, a back key 514*g*, a print cancel key 514*h*, and a forceful sheet output 514*i*.

In this exemplary embodiment, the operation panel 514 also includes, e.g., a special control mode key 514*j* to instruct shift to and canceling of the above-described special control mode. In such a case, as described above, a combination of operation buttons may be used to instruct shift to and canceling of the above-described special control mode.

In the above-described exemplary embodiments, the image forming apparatus has a configuration in which liquid droplets are horizontally ejected to from an image on a sheet. It is to be noted that the image forming apparatus is not limited to the above-described configuration. In some embodiments, for example, the image forming apparatus may have a configuration in which liquid droplets are ejected vertically downward to form an image on a sheet.

In the configuration in which liquid droplets are horizontally ejected, the nozzle faces of the recording heads are horizontally directed. Accordingly, as described above, by opening the openable cover, the nozzle faces of the recording heads are opened and exposed to the outside.

By contrast, in the configuration in which liquid droplets are ejected vertically downward, the nozzle faces of the recording heads are normally directed downward. Accordingly, the recording heads are rotated to expose the nozzle faces to an area opened by the openable cover.

The direction in which droplets are ejected is not limited to the horizontal or vertically downward direction. For example, liquid droplets may be ejected upward, obliquely downward, or obliquely upward.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus, comprising:

an apparatus body;

a recording head having a nozzle face and nozzles in the nozzle face to eject droplets of liquid;

a maintenance unit having a cap to protect the nozzle face of the recording head;

a carriage bearing the recording head, the nozzle face of the recording head in an image forming position facing horizontally, and the nozzle face of the recording head in a maintenance position facing downward;

a cover to open an interior of the apparatus body to an outside of the apparatus body; and a controller to perform a normal control to cap the nozzle face of the recording head with the cap on opening of the cover and a special control to expose the nozzle face of the recording head to an area opened by the cover on receipt of an external instruction, wherein in the special control, the controller rotates the recording head from the maintenance position, where the nozzle face of the recording head faces downward, to the image forming position, where the nozzle face of the recording head faces horizontally to face the front side of the apparatus body, so that the nozzle face of the recording head is exposed to the area opened by the cover.

2. The image forming apparatus of claim 1, further comprising an operation unit disposed on the apparatus body to input information and having plural operation keys to instruct the special control in combination.

3. The image forming apparatus of claim 1, wherein, in a state other than a state in which the nozzle face of the recording head is capped, the controller, on receipt of an instruction of the special control, causes the cap to cap the nozzle face of the recording head and starts the special control.

4. The image forming apparatus of claim 1, wherein, during execution of the special control, the controller, on receipt of a print instruction, starts printing after canceling of the special control.

5. The image forming apparatus of claim 1, further comprising a display part to display an indication that the special control is in execution.

6. The image forming apparatus of claim 1, further comprising an operation unit disposed on the apparatus body to input information and having plural operation keys to instruct canceling of the special control in combination.

7. The image forming apparatus of claim 1, wherein, when the cover is closed during execution of the special control, the controller cancels the special control.

8. The image forming apparatus of claim 1, wherein, in canceling the special control, the controller performs maintenance operation of the recording head and performs the normal control.

* * * * *